(12) United States Patent
Baransky et al.

(10) Patent No.: US 12,107,774 B2
(45) Date of Patent: Oct. 1, 2024

(54) SYSTEM AND METHOD FOR AUTONOMOUS CONVERSION OF A RESOURCE FORMAT USING MACHINE LEARNING

(71) Applicant: BANK OF AMERICA CORPORATION, Charlotte, NC (US)

(72) Inventors: Isabel Esther Baransky, New York, NY (US); Daniel Rapheal Stanton, Sacramento, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/883,277

(22) Filed: Aug. 8, 2022

(65) Prior Publication Data

US 2024/0048506 A1 Feb. 8, 2024

(51) Int. Cl.
*G06F 15/173* (2006.01)
*H04L 47/722* (2022.01)
*H04L 47/765* (2022.01)
*H04L 47/78* (2022.01)

(52) U.S. Cl.
CPC .......... *H04L 47/788* (2013.01); *H04L 47/722* (2013.01); *H04L 47/765* (2013.01)

(58) Field of Classification Search
CPC .... H04L 47/788; H04L 47/722; H04L 47/765
USPC ................................................. 709/223, 226
See application file for complete search history.

(56) References Cited

U.S. PATENT DOCUMENTS

| | | | |
|---|---|---|---|
| 5,729,599 A | * | 3/1998 | Plomondon ............ H04M 3/54 379/189 |
| 5,897,621 A | | 4/1999 | Boesch |
| 7,427,016 B2 | | 9/2008 | Chimento |
| 7,801,816 B2 | | 9/2010 | Alarcon-Luther |
| 8,392,285 B2 | | 3/2013 | Hahn-Carlson |
| 8,671,053 B2 | | 3/2014 | Cleary |
| 9,064,364 B2 | | 6/2015 | Abe |
| 10,185,936 B2 | | 1/2019 | Leary |
| 10,565,592 B2 | | 2/2020 | Enzaldo |
| 10,567,975 B2 | | 2/2020 | Hoffberg |
| 10,606,960 B2 | | 3/2020 | Grove |
| 10,922,754 B2 | | 2/2021 | Song |

(Continued)

FOREIGN PATENT DOCUMENTS

| | | | | |
|---|---|---|---|---|
| CN | 1578227 A | * | 2/2005 | |
| CN | 1638330 A | * | 7/2005 | ............ G06F 21/31 |

(Continued)

*Primary Examiner* — Liang Che A Wang
(74) *Attorney, Agent, or Firm* — Moore & Van Allen PLLC; Nicholas C. Russell

(57) ABSTRACT

Systems, computer program products, and methods are described herein autonomous conversion of a resource format using machine learning. The present invention is configured to receive a data transmission; extract, from the data transmission, a destination identifier and a primary data format; determine that the destination identifier is an approved destination identifier; compare the destination identifier to a plurality of reference patterns, wherein each reference pattern is associated with a set of conversion criteria; determine that the destination identifier does not match at least one set of conversion criteria; and convert, based on an output of a machine learning algorithm, the primary data format to a secondary data format.

14 Claims, 4 Drawing Sheets

(56) References Cited

U.S. PATENT DOCUMENTS

| | | |
|---|---|---|
| 11,042,882 B2 | 6/2021 | Ledford |
| 11,094,006 B1 | 8/2021 | Scarborough |
| 2006/0060646 A1 | 3/2006 | Lee |
| 2006/0123461 A1* | 6/2006 | Lunt .................. G06F 21/6254 726/1 |
| 2009/0248574 A1 | 10/2009 | Leung |
| 2013/0132275 A1 | 5/2013 | Enzaldo |
| 2016/0104239 A1 | 4/2016 | Johnson |
| 2020/0111085 A1 | 4/2020 | Pratten |
| 2020/0394533 A1* | 12/2020 | Ramalingam ........... G06F 18/25 |
| 2021/0400080 A1* | 12/2021 | Kaidi .................. H04L 63/0281 |

FOREIGN PATENT DOCUMENTS

| | | | |
|---|---|---|---|
| EP | 3012791 A1 | 4/2016 | |
| JP | 2012114917 A * | 6/2012 | ........... H04L 43/028 |
| WO | WO-2007115457 A1 * | 10/2007 | ............. G06F 21/55 |
| WO | 2016072934 A1 | 5/2016 | |

\* cited by examiner

SYSTEM AND METHOD FOR AUTONOMOUS CONVERSION OF A RESOURCE FORMAT USING MACHINE LEARNING

FIELD OF THE INVENTION

The present invention embraces a system for adaptive and autonomous conversion of a resource format using machine learning.

BACKGROUND

Currently, resource transfers exist on a global level and many resource accounts that are held outside of a user's country are likely denominated in a different resource format than that of the user's resource account. As such, when resources are sent to foreign resource accounts, the resources must be converted into the local resource format prior to the resource account owner receiving resources. There is a need for a way to identify whether a resource transfer must undergo a resource format conversion more effectively and efficiently.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the invention relate to systems, methods, and computer program products for autonomous resource format conversion, the invention including: receiving a data transmission; extracting, from the data transmission, a destination identifier and a primary data format; determining that the destination identifier is an approved destination identifier; comparing the destination identifier to a plurality of reference patterns, where each reference pattern is associated with a set of conversion criteria; determining that the destination identifier does not match at least one set of conversion criteria; and converting, based on an output of a machine learning algorithm, the primary data format to a secondary data format.

In some embodiments, determining that the destination identifier is an approved destination identifier includes querying a data repository of blocked destination identifiers and determining that the destination identifier is not associated with any of the blocked destination identifiers.

In some embodiments, the invention further includes determining that the destination identifier matches at least one set of conversion criteria and converting, based on a reference pattern associated with the at least one set of conversion criteria, the primary data format to a secondary data format.

In some embodiments, the invention further includes extracting, from the data transmission, a downstream edge point.

In some embodiments, the output of the machine learning algorithm includes a score associated with the data transmission and an identification of a matching downstream edge point from a plurality of known downstream edge points.

In some embodiments, converting, based on the output of the machine learning algorithm, the primary data format to the secondary data format includes comparing the score associated with the data transmission with a score associated with the matching downstream edge point.

In some embodiments, the data repository of blocked destination identifiers is automatically updated based on receipt of a data report from a managing entity system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
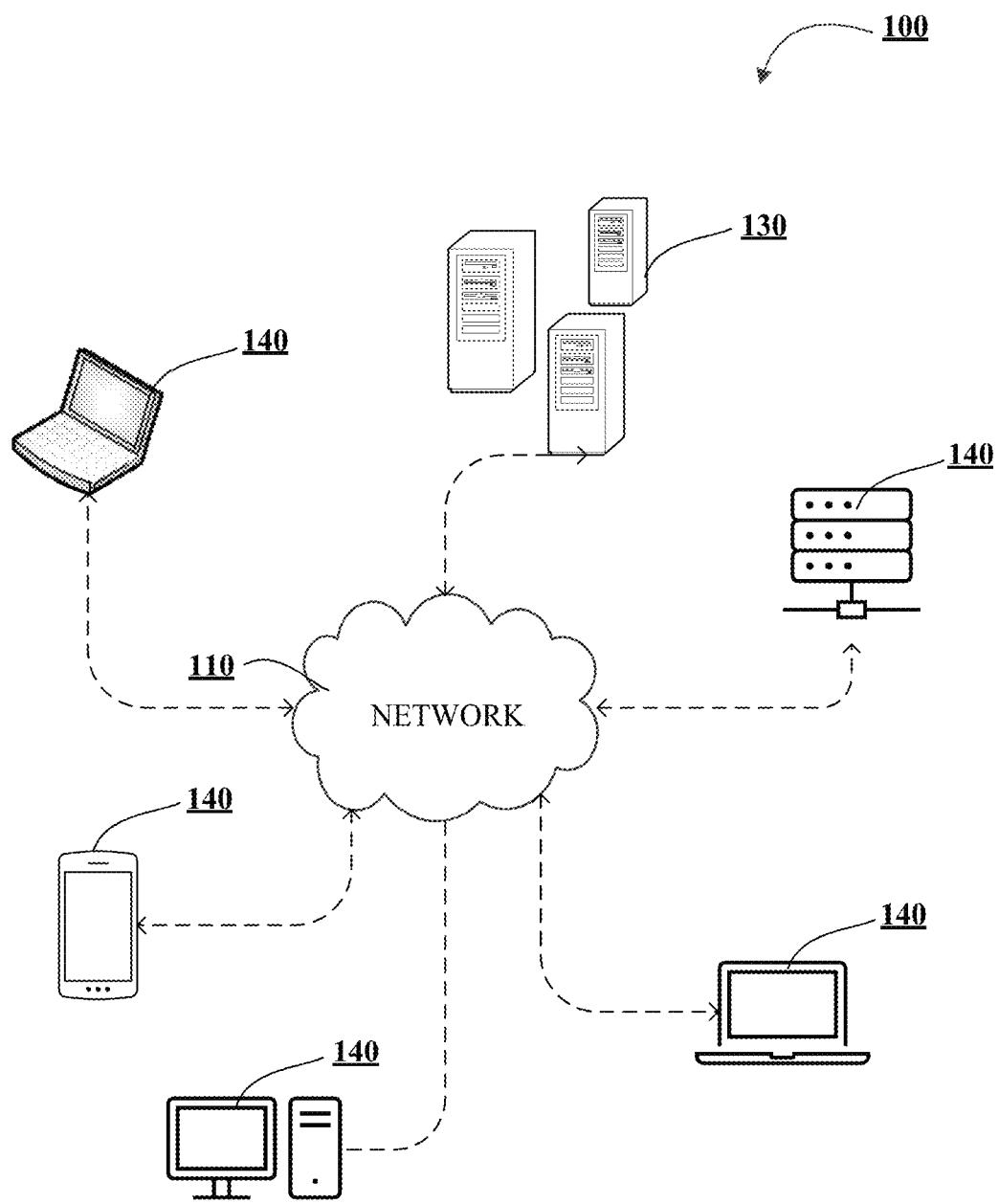
Figure 1B:
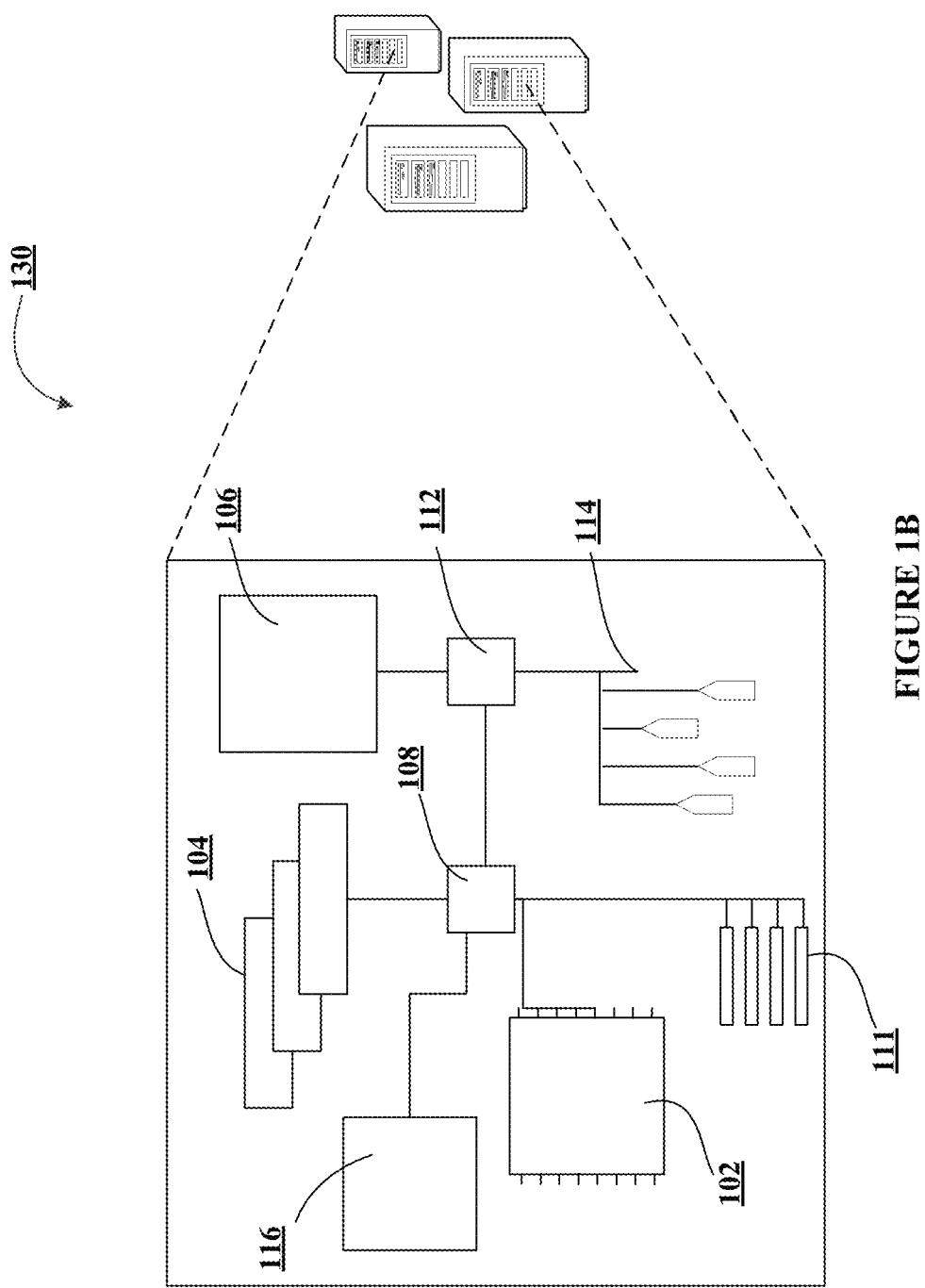
Figure 1C:
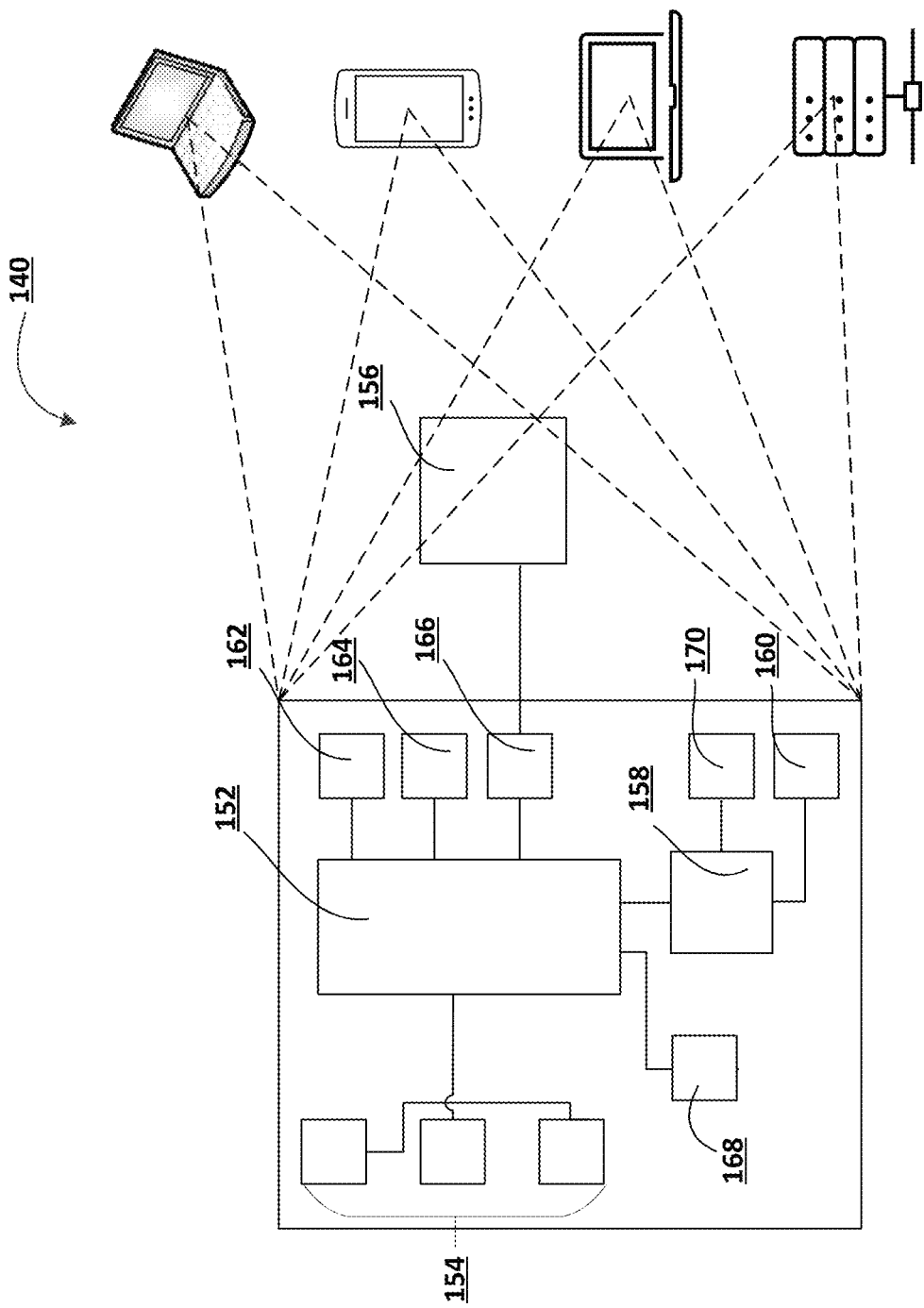
Figure 2:
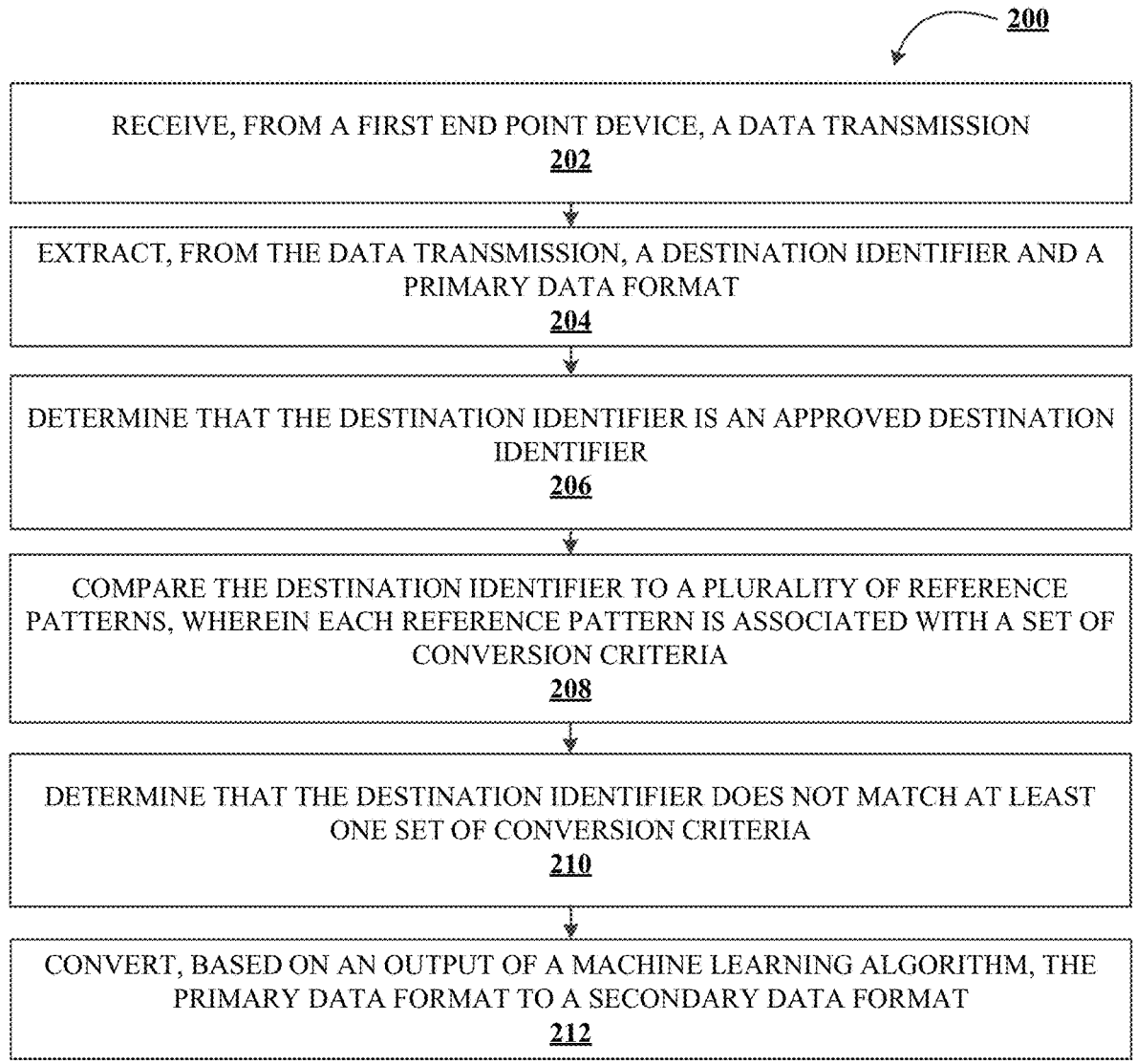

Having thus described embodiments of the invention in general terms, reference will now be made the accompanying drawings, wherein:

FIGS. 1A-1C illustrates technical components of an exemplary distributed computing environment for autonomous resource conversion, in accordance with an embodiment of the invention; and FIG. 2 illustrates a process flow for autonomous resource format conversion, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" or "managing entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications. "Application" as used herein may refer to any computer or software program which may serve one or more purposes relating to the entity, such as execution of products or services, data analysis and management, information security, internal and/or external communications, and/or any other function performed by the entity.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity. In some instances, a "user" is an individual who has a relationship with the entity, such as a customer or a prospective customer. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "resource format" or "currency" may refer to currency of the originator of a resource transfer and/or the currency of a beneficiary. The currency may be the Euro, Japanese Yen, Pound Sterling, Australian Dollar, Canadian Dollar, Swiss Franc, or other resource formats.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

The system allows for use of a machine learning engine to more efficiently identify whether a resource transfer must undergo a resource format conversion. The machine learning engine may collect pending resource transfer information from a plurality of sources and predict the resource format conversion, if any, associated with said sources. A single user may initiate resource transfers through a plurality of managing entities or financial institutions. By collecting data associated with each resource transfer, the system may identify data trends and generate predictions of future resource transfers or resource format conversions independently of intervention from the managing entity which may facilitate the resource transfer or resource format conversion.

Because resource transfers exist on a global level and many resource accounts are held outside of a user's country, and are likely denominated in a different resource format than that of the user's resource account, there is a need to effectively predict whether a resource transfer must undergo a resource format conversion. In this way, the system may benefit a number of managing entities and users, by providing real-time resource transfer insights and data analysis of various resource format conversions that may not be obtainable solely via human intervention. Additionally, the features and functions of the system may provide a managing entity with real-time suggestions of actions that may increase the volume of future resource transfers executed by the managing entity.

Machine learning has enabled the automated processing of problems formerly limited to human intervention. Machine learning may be used to allow a computer to perform the same or similar tasks without being explicitly programmed to do so. Machine learning has benefits far beyond programming efficiency: machines may also learn and identify correlations in data that would otherwise go undetected if reviewed by humans. Machine learning algorithms are asked to label data in large data sets. For example, a machine learning algorithm may be asked to make future predictions based on current data, may be asked to group data, may be asked to determine human-language responses to queries or the like.

Accordingly, the present invention receives from an originating user or entity, a resource transfer transmission; extracts from the resource transfer transmission, a resource transfer identifier indicative of destination and destination currency; determines that the destination identifier is not blocked; compares the approved destination identifier to a plurality of reference patterns, and each reference pattern consists of a set of known patterns; determines that the destination identifier does not match any of the known reference patterns; and converts, based on a score output by a machine learning algorithm, the originating currency to the beneficiary currency.

What is more, the present invention provides a technical solution to a technical problem. As described herein, the technical problem includes accurately and efficiently identifying whether a resource transfer needs to undergo a resource format conversion. The technical solution presented herein allows for a multi-step process using machine learning algorithms to more accurately and efficiently identify whether a resource transfer needs to undergo a resource format conversion. In particular, the system and method for autonomous conversion of a resource format using machine learning is an improvement over existing solutions regarding resource format conversion, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1B illustrate technical components of an exemplary distributed computing environment for autonomous resource format conversion 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, a user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 is a high-level process flow diagram illustrating a process 200 using the autonomous resource conversion system, in accordance with one embodiment of the present disclosure. The process begins at block 202, wherein the system receives, from a first end-point device, a data transmission. The first end-point device may be a user device or a mobile device, such as, a mobile phone, personal computing devices, tablet computers, wearable devices, and/or any portable electronic device capable of receiving and/or storing data therein and are owned, operated or managed by a user. In some embodiments, a first end-point device may be associated with an individual or user, entity or system who has a relationship with the entity, such as a customer or prospective customer. The terms "user" and "customer" may be used interchangeably. In other embodiments, a user may be a system performing one or more tasks described herein. In some embodiments, a first end-point device may be associated with an employee (e.g., an associate, a project manager, an IT specialist, a manager, an administrator, an internal operations analyst, or the like) of the entity or enterprises affiliated with the entity, capable of operating the systems described herein.

In some embodiments, a data transmission may consist of a transfer of the originating user's or entity's resource transfer identifier and/or the destination's resource transfer identifier. Resource transfer identifiers may consist of such as numbers associated with an account, a deposit account, transactional accounts (e.g. a banking account), a savings account, an investment account, a money market account, a time deposit, a demand deposit, a pre-paid account, a credit account, user information or the like. In some embodiments, the data transmission may transfer electronic tokens, credit card numbers, debit card numbers, checks, loyalty card numbers, account identifiers, routing numbers, passcodes and the like that are associated with one or more resources or accounts of the originating user or entity and/or destination. In some embodiments, the data transmission may also consist of destination identifiers, including geographic locations, phone numbers, addresses, zip codes, entity name, user name, or other information associated with the destination. The data transmission may also consist of identifiers, including geographic locations, phone numbers, addresses, zip codes, entity name, user name, or other information associated with the user or originator of the resource transfer. In some embodiments, the data transmission may comprise machine-readable data. In other embodiments, the data transmission may comprise human-readable data. In some embodiments, the data transmission may comprise both machine-readable data and human-readable data.

The process may then continue to block 204, wherein the system extracts, from the data transmission, a destination identifier and a primary data format. In some embodiments, the destination identifier may correspond to an individual or a user. In other embodiments, the destination identifier may correspond to an entity. In some embodiments, the destination identifier may be a beneficiary name, address, a destination zip code, and/or beneficiary account number or other information associated with the beneficiary. For example, the destination identifier may be account numbers, routing codes or bank branches associated with the beneficiary.

In some embodiments, the primary data format (e.g., the resource format of the originating user or entity, or a resource format set by the originating user or entity) may be a currency designation or country code. For example, the primary data format may consist of a set of unique identifiers that typically identifies the destination currency as the Euro. The set of unique identifiers may consist of a series of numerical digits, a series of letters, or a combination of letters and numerical digits or have alphanumeric characters. For example, the user originating the resource transfer may be located in the United States, and its country code is associated with a unique set of identifiers that indicate that its currency designation is the United States Dollar. As another example, the beneficiary may be located in Japan, and its country code is associated with a unique set of identifiers that indicate that its currency designation is the Japanese Yen. As another non-limiting example, the primary data format may consist of a set of unique identifiers that identifies the destination currency as the Euro, Japanese Yen, Pound Sterling, Australian Dollar, Canadian Dollar, Swiss Franc, or other resource formats.

In this way, the system may extract, from the data transmission, a downstream edge point. The downstream edge point may be any destination identifier. For example, the downstream edge point may be the country code or the currency designation. In another example, the downstream edge point may be the name of the beneficiary. In another example, the downstream edge point may be multiple destination identifiers.

The process may then continue to block 206, wherein the system determines that the destination identifier is an approved destination identifier. To determine whether the destination identifier is an approved destination identifier, the process queries a data repository of blocked destination identifiers, a "blocklist", and determines that the destination identifier is not associated with any of the blocked destination identifiers. A blocked destination identifier will be present on the blocklist. If the destination identifier is an approved destination identifier, the process may proceed to the next step.

In one embodiment, the destination identifier is present on the blocklist. In this embodiment, the process does not continue.

In other embodiments, the destination identifier is not present on the blocklist. In this case, the destination identifier is an approved destination identifier and the process may proceed to the next step.

The data repository of blocked destination identifiers, or the blocklist, is automatically updated based on receipt of a data report from a second end-point device. The second end-point device may be a managing entity system. The second end-point device may produce and send data reports at any time. For example, the second end-point device may produce and send data reports every minute, hourly, daily, monthly, bi-monthly, every few months, or annually. In this way, the data repository of blocked destination identifiers may be updated as frequently as the managing entity system determines.

The process may then continue to block 208, wherein the system is further configured to compare the destination identifier to a plurality of reference patterns, wherein each reference pattern is associated with a set of conversion criteria. A reference pattern is a rules based system that identifies patterns within a destination identifier. For example, the destination identifier may be the beneficiary account number. In this way, the reference pattern may identify patterns in the beneficiary account number and may determine account number location, check digit and/or account resource format.

In one embodiment, if the system determines that the destination identifier matches at least one set of conversion criteria, then the system will convert, based on a reference pattern associated with the at least one set of conversion criteria, the primary data format to a secondary data format (e.g., the resource format associated with the beneficiary).

The reference patterns may be located in a repository of reference patterns. The repository of reference patterns may be automatically updated based on receipt of additional reference patterns from a second end-point device. The second-end point device may be associated with a managing entity system or an entity other than the managing entity system. The second end-point device may be a mobile device, such as, a mobile phone, personal computing devices, tablet computers, wearable devices, and/or any portable electronic device capable of receiving and/or storing data therein and are owned, operated or managed by a user. In some embodiments, a second end-point device may be associated with an entity or system who has a relationship with the managing entity system. In some embodiments, the second end-point device may be associated with an employee (e.g., an associate, a project manager, an IT specialist, a manager, an administrator, an internal operations analyst, or the like) of the managing entity or enterprises affiliated with the managing entity, capable of operating the systems described herein.

The second-end point device may produce and send reference patterns to the repository of reference patterns at any time. For example, the second end-point device may produce and send reference patterns to the repository of reference patterns every second, minute, hourly, daily, monthly, bi-monthly, every few months, annually, or any amount of time therebetween. In this way, the data repository of reference patterns may be updated as frequently as the managing entity determines.

In one embodiment, the conversion criteria may be identified by the managing entity as an exclusion or inclusion value. The system may attempt to match the destination identifier to a conversion criteria based on its reference pattern. If the system matches the destination identifier to a reference pattern, it identifies whether the conversion criteria is an exclusion or inclusion value. If the destination identifier matches an inclusion value reference pattern, the primary data format is converted into the secondary data format.

If the system determines that the destination identifier matches at least one set of conversion criteria, the system will convert the originating user's currency designation to the beneficiary's currency designation. For example, if the system determines, in a United States originating resource transfer, that a destination identifier matches at least one set of conversion criteria indicative of a European destination, the system will convert a United States originating user's currency designation, the United States Dollar, to the beneficiary's currency designation, for example, the Euro. The secondary data format may be the Euro, Japanese Yen, Pound Sterling, Australian Dollar, Canadian Dollar, Swiss Franc, or other resource formats. If the primary data format is converted into the secondary data format, the process does not proceed to the next step.

In another embodiment, the destination identifier matches an exclusion value reference pattern, and the primary data format is converted into the secondary data format.

The process may then continue to block 210, wherein the system determines that the destination identifier does not match at least one set of conversion criteria. In this way, the system determines that the destination identifier does not match at least one set of conversion criteria, and does not convert, based on the reference pattern associated with the at least one set of conversion criteria, the primary data format to a secondary data format. For example, if the destination identifier does not match an inclusion value conversion criteria, the primary data format is not converted into the secondary data format, and the process proceeds to the next step. In another embodiment, the destination identifier does not match an exclusion value conversion criteria and the primary data format is not converted into the secondary format, and the process proceeds to the next step.

The process may then continue to block 212, wherein the process converts, based on an output of a machine learning algorithm, the primary data format to a secondary data format. The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like. In one embodiment, the machine learning algorithm may include a light gradient boosted trees classifier with early stopping.

The machine learning algorithm may be based on historical data relating to resource format conversions and other conversions from primary data formats to secondary data formats. Historical data may include past resource transfers processed by an entity, currency values over time, exchange rates, or the like.

In some embodiments, the machine learning algorithm may predict one or more future resource format conversions, including determining a plurality of adjustments which will result in more accurate and efficient resource format conversions by the system. The machine learning algorithm may mine data from repositories of user resource transfer trends, resource transfer trends from entities other than the managing entity system, and/or historical data outputted by the system.

In some embodiments, the output of the machine learning algorithm comprises a score associated with the data transmission and an identification of a matching downstream edge point from a plurality of known downstream edge points. The score associated with the data transmission may be binary. In this way, the score may be "yes" or "no". In another embodiment, the score may be "true" or "false".

In another embodiment, the score associated with the data transmission may be between "0" to "1". In some examples, the score is at least 0. In some examples, the score is at least about 0.05 and all numbers therebetween. In some examples, the score is at least about 0.1 and all numbers therebetween. In some examples, the score is at least about 0.15 and all numbers therebetween. In some examples, the score is at least about 0.2 and all numbers therebetween. In some examples, the score is at least about 0.25 and all numbers therebetween. In some examples, the score is at least about 0.3 and all numbers therebetween. In some examples, the score is at least about 0.35 and all numbers therebetween. In some examples, the score is at least about 0.4 and all numbers therebetween. In some examples, the score is at least about 0.45 and all numbers therebetween. In some examples, the score is at least about 0.5 and all numbers therebetween. In some examples, the score is at least about 0.55 and all numbers therebetween. In some examples, the score is at least about 0.6 and all numbers therebetween. In some examples, the score is at least about 0.65 and all numbers therebetween. In some examples, the score is at least about 0.7 and all numbers therebetween. In some examples, the score is at least about 0.75 and all numbers therebetween. In some examples, the score is at least about 0.8 and all numbers therebetween. In some examples, the score is at least about 0.85 and all numbers therebetween. In some examples, the score is at least about 0.9 and all numbers therebetween. In some examples, the score is at least about 0.95 and all numbers therebetween. In some examples, the score is 1.

In other embodiments, the score associated with the data transmission may be categorical, scalar, or ordinal. In some embodiments, the score associated with the data transmission may include an integer, a string of variables, alphanumeric, or other values.

In one embodiment, The machine learning algorithm produces a score associated with the data transmission by analyzing a variety of destination identifiers and/or historical data. In some embodiments, a downstream edge point is selected from a plurality of destination identifiers. For example, the downstream edge point may be the beneficiary's country code or a currency designation. In another example, the downstream edge point may be the name of the beneficiary. In another example, the downstream edge point may be multiple destination identifiers associated with the beneficiary. In another example, the downstream edge point may include wire initiation time.

The system continues by identifying a matching downstream edge point from a plurality of known downstream edge points. In one embodiment, the known downstream edge points may be located in a single repository of known downstream edge points. In another embodiment, there may be multiple repositories of known downstream edge points. In one example, there may be a repository of known downstream edge points consisting of the name of the beneficiary. In another example, there may be a repository of known downstream edge points consisting of country code or currency designation.

In one embodiment, the repositories of known downstream edge points may be automatically updated based on receipt of additional known downstream edge points from the managing entity or managing entity system. In another embodiment, the repositories of known downstream edge points may be automatically updated based on receipt of the additional known downstream edge points from the machine learning algorithm. For example, the managing entity system or the machine learning algorithm may send known downstream edge points to the repository of known downstream edge points every second, minute, hour, day, month, bi-monthly, every few weeks, annually, or any amount of time therebetween.

In one embodiment, each known downstream edge point within the repository of known downstream edge points is assigned a score associated with the matching downstream edge point. The score associated with the matching downstream edge point is a pre-determined score that may be based on historical data, such as the success of prior resource transfers and resource format conversions. In some embodiments, the score associated with the matching downstream edge point is at least 0. In some embodiments, there is no score associated with the matching downstream edge point, as the downstream edge point may not meet performance criteria of the managing entity system. In some examples, the score is at least about 0.05 and all numbers therebetween. In some examples, the score is at least about 0.1 and all numbers therebetween. In some examples, the score is at least about 0.15 and all numbers therebetween. In some examples, the score is at least about 0.2 and all numbers therebetween. In some examples, the score is at least about 0.25 and all numbers therebetween. In some examples, the score is at least about 0.3 and all numbers therebetween. In some examples, the score is at least about 0.35 and all numbers therebetween. In some examples, the score is at least about 0.4 and all numbers therebetween. In some examples, the score is at least about 0.45 and all numbers therebetween. In some examples, the score is at least about 0.5 and all numbers therebetween. In some examples, the score is at least about 0.55 and all numbers therebetween. In some examples, the score is at least about 0.6 and all numbers therebetween. In some examples, the score is at least about 0.65 and all numbers therebetween. In some examples, the score is at least about 0.7 and all numbers therebetween. In some examples, the score is at least about 0.75 and all numbers therebetween. In some examples, the score is at least about 0.8 and all numbers therebetween. In some examples, the score is at least about 0.85 and all numbers therebetween. In some examples, the score is at least about 0.9 and all numbers therebetween. In some examples, the score is at least about 0.95 and all numbers therebetween. In some examples, the score is 1.

Once the system receives a score associated with the data transmission as a machine learning algorithm output, the system will convert, based on the output of the machine learning algorithm, the primary data format to the secondary data format, by comparing the score associated with the data transmission with the pre-determined score associated with the matching downstream edge point. The score associated with the matching downstream edge point is located within the repository of known downstream edge points.

If the score associated with the data transmission exceeds the score associated with the matching downstream edge point, the primary data format is converted into the secondary data format. If the score associated with the data transmission does not exceed the score associated with the matching downstream edge point, the primary data format is not converted into the secondary data format.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for autonomous resource format conversion, the system comprising:
    at least one non-transitory storage device; and
    at least one processing device coupled to the at least one non-transitory storage device, wherein the at least one processing device is configured to:
        receive, from an originating user or entity, a data transmission, wherein the data transmission is a transmission of currency;
        extract, from the data transmission, a destination identifier and a primary data format, wherein the destination identifier identifies comprises at least one account number and a destination zip code and the destination identifier associated with a beneficiary a secondary data format, wherein the secondary data format comprises a destination currency, and wherein the primary data format comprises an originating currency;
        determine the destination identifier is an approved destination identifier, wherein determining the destination identifier is an approved destination identifier comprises querying a data repository of blocked destination identifiers and determining the destination identifier is not associated with any of the blocked destination identifiers;
        compare the approved destination identifier to a plurality of reference patterns, wherein each reference pattern is associated with a set of known identifiers including exclusion values and inclusion values;
        identify the destination identifier not matching at least one set of the inclusion values or the destination identifier matching at least one set of the exclusion values; and
        convert, based on an output of a machine learning engine, the primary data format to the secondary data format, wherein the output of the machine learning engine further comprises identifying a match of the destination identifier to a downstream edge point from a plurality of known downstream edge points, wherein the downstream edge point comprises a country code and at least one destination identifier associated with the beneficiary.

2. The system of claim 1, wherein the at least one processing device is further configured to extract, from the data transmission, downstream edge point.

3. The system of claim 2, wherein the output of the machine learning algorithm comprises a score associated with the data transmission.

4. The system of claim 3, wherein converting, based on the output of the machine learning algorithm, the primary data format to the secondary data format comprises comparing the score associated with the data transmission with a score associated with the matching downstream edge point.

5. The system of claim 1, wherein the data repository of blocked destination identifiers is automatically updated based on receipt of a data report from a second end-point device.

6. A computer program product for autonomous resource format conversion, the computer program product comprising at least one non-transitory computer-readable medium having computer-readable program code portions embodied therein, the computer-readable program code portions comprising:
    an executable portion configured to receive, from an originating user or entity, a data transmission, wherein the data transmission is a transmission of currency;
    an executable portion configured to extract, from the data transmission, a destination identifier and a primary data format, wherein the destination identifier comprises at least one account number and a destination zip code and the destination identifier associated with a beneficiary identifies a secondary data format, wherein the secondary data format comprises a destination currency, and wherein the primary data format comprises an originating currency;
    an executable portion configured to determine the destination identifier is an approved destination identifier, wherein determining the destination identifier is an approved destination identifier comprises querying a data repository of blocked destination identifiers and determining the destination identifier is not associated with any of the blocked destination identifiers;
    an executable portion configured to the approved destination identifier to a plurality of reference patterns, wherein each reference pattern is associated with a set of known identifiers including exclusion values and inclusion values;
    an executable portion configured to the destination identifier not at least one set of the inclusion values or the destination identifier at least one set of the exclusion values; and
    an executable portion configured to convert, based on an output of a machine learning engine, the primary data format to the secondary data format, wherein the output of the machine learning engine further comprises identifying a match of the destination identifier to a downstream edge point from a plurality of known downstream edge points, wherein the downstream edge point comprises a country code and at least one destination identifier associated with the beneficiary.

7. The computer program product of claim 6, further comprising an executable portion configured to extract, from the data transmission, the downstream edge point.

8. The computer program product of claim 7, wherein the output of the machine learning algorithm comprises a score associated with the data transmission.

9. The computer program product of claim 8, wherein converting, based on the output of the machine learning algorithm, the primary data format to the secondary data format comprises comparing the score associated with the data transmission with a score associated with the matching downstream edge point.

10. The computer program product of claim 6, wherein the data repository of blocked destination identifiers is automatically updated based on receipt of a data report from a second end-point device.

11. A computer-implemented method for autonomous resource format conversion, the method comprising:
- providing a computing system comprising a computer processing device and a non-transitory computer readable medium, wherein the computer readable medium comprises configured computer program instruction code, wherein said instruction code is when operated causes the computer processing device to perform the following operations:
  - receiving, from an originating user or entity, a data transmission, wherein the data transmission is a transmission of currency;
  - extracting, from the data transmission, a destination identifier and a primary data format, wherein the destination identifier comprises at least one account number and a destination zip code and the destination identifier associated with a beneficiary identifies a secondary data format, wherein the secondary data format comprises a destination currency, and wherein the primary data format comprises an originating currency;
  - determining the destination identifier is an approved destination identifier, wherein determining the destination identifier is an approved destination identifier comprises querying a data repository of blocked destination identifiers and determining the destination identifier is not associated with any of the blocked destination identifiers;
  - comparing the approved destination identifier to a plurality of reference patterns, wherein each reference pattern is associated with a set of known identifiers including exclusion values and inclusion values;
  - identifying the destination identifier not matching at least one set of the inclusion values or the destination identifier matching at least one set of the exclusion values; and
  - converting, based on an output of a machine learning engine, the primary data format to the secondary data format, wherein the output of the machine learning engine further comprises identifying a match of the destination identifier to a downstream edge point from a plurality of known downstream edge points, wherein the downstream edge point comprises a country code and at least one destination identifier associated with the beneficiary.

12. The computer-implemented method of claim 11, further comprising extracting, from the data transmission, the downstream edge point.

13. The computer-implemented method of claim 12, wherein the output of the machine learning algorithm comprises a score associated with the data.

14. The computer-implemented method of claim 13, wherein converting, based on the output of the machine learning algorithm, the primary data format to the secondary data format comprises comparing the score associated with the data transmission with a score associated with the matching downstream edge point.

* * * * *